Dec. 5, 1967 W. LEHMANN 3,356,290
BLOWER SHAFT SEAL

Filed May 27, 1964 2 Sheets-Sheet 1

Inventor:
WALTER LEHMANN

By K. A. Mayr
Attorney

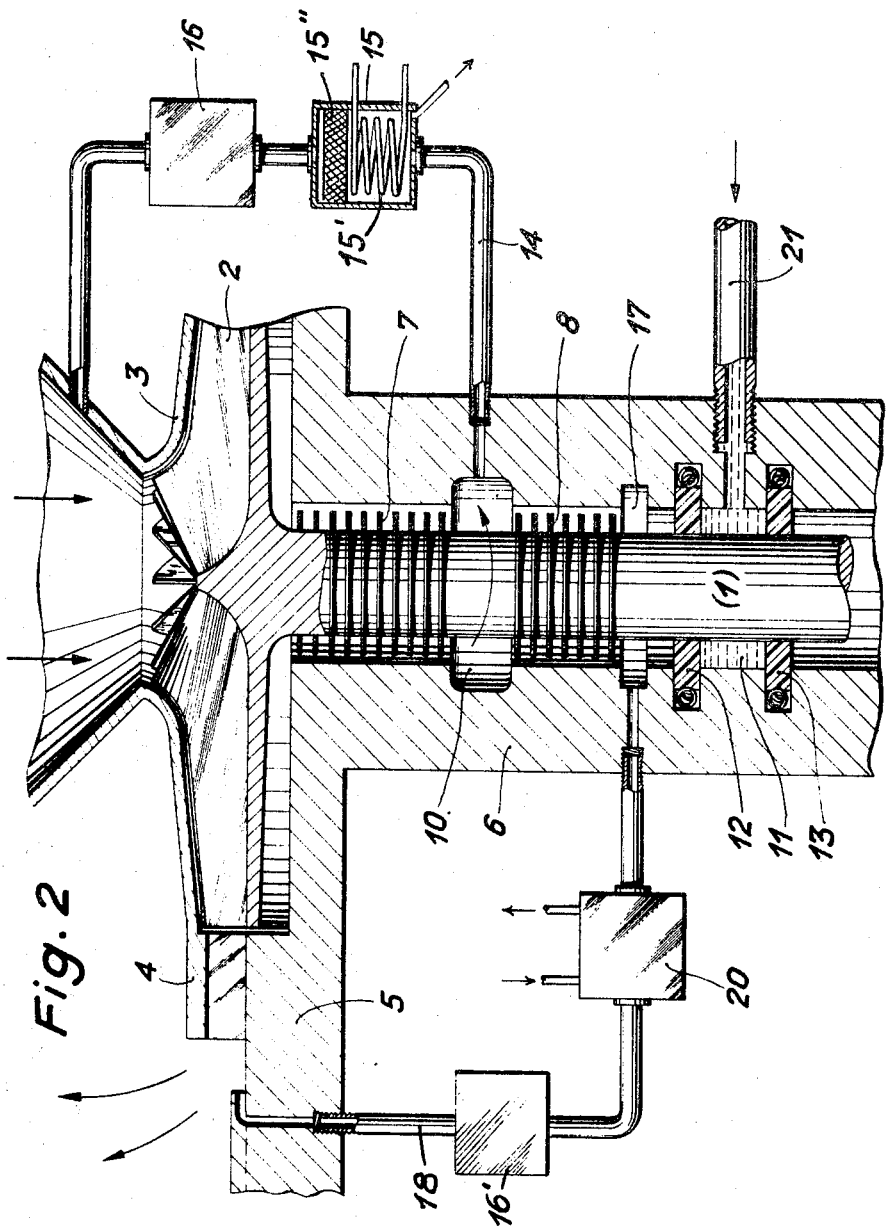

United States Patent Office 3,356,290
Patented Dec. 5, 1967

3,356,290
BLOWER SHAFT SEAL
Walter Lehmann, Winterthur, Switzerland, assignor to Sulzer Brothers Limited, Winterthur, Switzerland, a corporation of Switzerland
Filed May 27, 1964, Ser. No. 370,654
Claims priority, application Switzerland, May 31, 1963, 6,883/63
4 Claims. (Cl. 230—132)

The invention relates to a seal for the shaft of a blower, particularly of a circulating blower of a gas-cooled nuclear reactor plant, and more particularly to a shaft seal including a labyrinth packing and a liquid seal which is placed at the end of the labyrinth packing which is distant from the impeller, an intermediate part of the labyrinth packing being connected to the suction side of the blower.

In blowers forming part of nuclear reactor plants it is absolutely essential that leakage of the gaseous reactor coolant along the rotating shaft to the outside be avoided to prevent radioactive contamination. Entry of liquid from the liquid seal into the circuit of the gaseous reactor coolant must also be avoided. This liquid is usually water which may cause serious corrosion in the reactor. Similar danger exists when using different sealing liquids.

A shaft seal of the aforedescribed type and having a labyrinth packing and a liquid seal adjacent thereto is known whereby an intermediate part of the labyrinth packing is connected to the suction side of the blower. The conventional seal does not assure sufficient sucking off of the liquid at all operating conditions of the plant and it is, for example, possible that liquid escaping from the liquid seal stagnates in the part of the labyrinth seal which is adjacent to the liquid seal which may cause, for example, corrosion.

It is an object of the present invention to provide a shaft seal of the aforedescribed kind which avoids the aforesaid disadvantages of conventional arrangements. In the shaft seal according to the invention a part of the labyrinth packing which part is located between the liquid seal and the intermediate portion of the labyrinth packing which is connected to the intake of the blower, is connected to the pressure or outlet side of the blower.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 2 is a large scale longitudinal, sectional view of a portion of the plant shown in FIG. 1.

Figure 1:
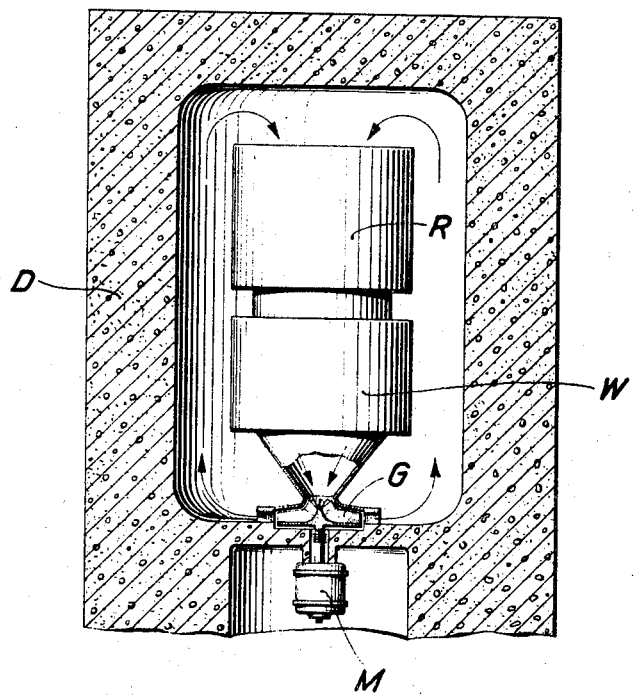
FIG. 1 is a diagrammatic part-sectional elevation of a nuclear reactor plant including a shaft seal according to the invention.

Referring more particularly to FIG. 1 of the drawing, D designates a pressure vessel containing a nuclear reactor R which includes a heat exchanger W. A circulating blower G driven by an electric motor M is located below the heat exchanger W. The pressure vessel D is filled with a gas, for example $CO_2$, whose pressure is higher than that of the surrounding atmosphere. The circulating blower G forces the gas through channels, not shown, in the reactor R wherein the gas is heated. The heated gas flows into the heat exchanger W where it transfers heat to an operating medium, for example water, which is thereby evaporated. The steam generated in the heat exchanger W is used in the conventional manner, for example, in a steam turbine plant, not shown, for producing useful power.

The gas cooled in the heat exchanger W enters the circulating blower G and leaves the blower in the direction of the arrows for return to the reactor.

As shown in FIG. 2, a shaft 1 rotating in bearings, not shown, supports an impeller 2 placed in a housing 3. The impeller discharges into a diffusor 4 surrounding the impeller and resting on the wall 5 of the pressure vessel D. From the wall 5 extends a sealing housing 6 wherein parts 7 and 8 of a labyrinth packing having a cavity 10 between said parts, and a liquid seal 11 are arranged in consecutive order. The liquid seal 11 is confined between two sealing rings 12 and 13. The cavity 10 is connected by a pipe 14 to the suction side of the housing 3. A separator 15 is interposed in the pipe 14 for separating sealing liquid, which may be vaporized, from the reactor cooling gas. Also interposed in the pipe 14 is a filter 16 which additionally purifies the cooling gas. An intermediate space 17 which is connected by a pipe 18 to the pressure side of the blower is provided between the part 8 of the labyrinth packing and the liquid seal 11. A cooler 20 is interposed in the pipe 18 for cooling the cooling gas. A filter 16' similar to the filter 16 may be interposed in the pipe 18 and may be associated with the cooler 20, if desired. The liquid seal 11 receives sealing liquid, for example water, through a pipe 21. The pressure of this liquid, in the entire operating range of the plant, is higher than the gas pressure at the pressure side of the circulating blower. The pressure of the sealing liquid may be variable, but is always, for example, two atmospheres higher than the pressure of the cooling gas.

During operation a portion of the reactor cooling gas, for example $CO_2$, enters the cavity 10 through the part 7 of the labyrinth packing and is conducted through the pipe 14 to the suction side of the circulating blower. At the same time gas flows through the pipe 18, the intermediate space 17 and the part 8 of the labyrinth packing into the cavity 10 and therefrom to the suction side of the blower. This gas current absorbs liquid escaping from the liquid seal 11 and carries the liquid into the separator 15 wherein it is removed from the gas. Normally, the water escaping from the liquid seal 11 evaporates immediately. The separation of the vapor or steam in the separator 15 may be effected, for example, by cooling, wherefor a cooling coil 15' is provided, and subsequent drying, for example, chemically, wherefor a suitable chemical substance 15" is provided.

With the arrangement of the shaft seal according to the invention the part of the labyrinth packing which is next to the liquid seal is continuously scavenged so that stagnation of the liquid leaving the liquid seal in the part 8 of the labyrinth packing is made impossible and adverse effects connected therewith, for example corrosion, are prevented. It is also possible to continuously cool the sealing rings 12, 13 of the liquid seal 11 and also the portion of the shaft adjacent to the liquid seal by cooling the gas supplied to the intermediate space 17 in the cooler 20. In this way the elements of the liquid seal are protected and undesired great temperature differences in the material of which the shaft is made are avoided.

I claim:
1. In combination with
   a pressure vessel having a sealing housing,
   a blower shaft passing through said sealing housing,
   an impeller mounted on an end of said blower shaft spaced from said sealing housing,
   a fluid inlet for passing fluid to said impeller, and
   a fluid outlet for passing fluid from said impeller;
   a seal comprising:
   a labyrinth packing adjacent said impeller,
   a liquid seal adjacent said labyrinth packing,
   said labyrinth packing having an intermediate portion connected to said fluid inlet for discharging fluid thereinto, and fluid receiving means interposed between said intermediate portion and said liquid seal and connected to said fluid outlet for receiving fluid therefrom at a pressure higher than the pressure in said intermediate portion.

2. The combination as defined in claim 1 wherein said fluid receiving means is interposed between said labyrinth packing and said liquid seal.

3. In combination with
a pressure vessel having sealing housing,
a blower shaft passing through said sealing housing,
an impeller mounted on an end of said blower shaft spaced from said sealing housing,
a fluid inlet for passing fluid to said impeller, and
a fluid outlet for passing fluid from said impeller;
a seal comprising:
a labyrinth packing adjacent said impeller,
a liquid seal adjacent said labyrinth packing,
said labyrinth packing having an intermediate portion connected to said fluid inlet for discharging fluid thereinto,
fluid receiving means interposed between said intermediate portion and said liquid seal,
a conduit connecting said fluid receiving means to said fluid outlet for conducting fluid into said fluid receiving means, and
a filter interposed in said conduit.

4. In combination with
a pressure vessel having sealing housing,
a blower shaft passing through said sealing housing,
an impeller mounted on an end of said blower shaft spaced from said sealing housing,
a fluid inlet for passing fluid to said impeller, and
a fluid outlet for passing fluid from said impeller;
a seal comprising:
a labyrinth packing adjacent said impeller,
a liquid seal adjacent said labyrinth packing,
said labyrinth packing having an intermediate portion connected to said fluid inlet for discharging fluid thereinto,
fluid receiving means interposed between said intermediate portion and said liquid seal,
a conduit connecting said fluid receiving means to said fluid outlet for conducting fluid into said fluid receiving means, and
a cooler interposed in said conduit.

References Cited

UNITED STATES PATENTS

| 2,820,652 | 1/1958 | Oechslin | 277—15 |
| 3,161,413 | 12/1964 | Audemar | 277—15 X |

FOREIGN PATENTS 1,351,678  12/1963  France.

SAMUEL ROTHBERG, *Primary Examiner.*